L. Stimson,
Wrapping Scythes.
No. 100,949.    Patented Mar. 15, 1870.
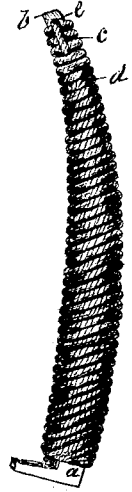
Witnesses.
Inventor.
Lorit Stimson

United States Patent Office.

LOVITT STIMSON, OF NEW HARTFORD, CONNECTICUT, ASSIGNOR TO THE GREENWOODS SCYTHE COMPANY, OF SAME PLACE

Letters Patent No. 100,949, dated March 15, 1870.

IMPROVEMENT IN WRAPPING SCYTHES FOR TRANSPORTATION.

The Schedule referred to in these Letters Patent and making part of the same

*To all whom it may concern:*

Be it known that I, LOVITT STIMSON, of New Hartford, county of Litchfield, and State of Connecticut, have invented certain new and useful Improvements in the Mode or Process of Wrapping Scythes for Market; and to enable others skilled in the art to make and use the same, I will proceed to describe, referring to the drawings, in which the same letters indicate like parts in each of the figures.

The nature of this invention consists in packing two or more scythes, or other like articles, together, having a skewer of wood, or other suitable material, placed between their points, and secured in that position by a binder or cord passing through a hole formed in or near the end of said skewer, the ends of which are bound in by the sides of the scythes and the wrapping material, the object of which is to firmly secure the skewer from the liability of being removed in handling or in transportation, and thereby prevent loss and damage to the scythes.

In the accompanying drawing—

Figure 1 is a sectional view.

Figure 2 shows the external appearance when bound or wrapped for market.

$a$ are the scythes.

$b$ is the skewer.

$c$, the binder-cord.

$d$, the wrapping material.

These scythes, two or more, are placed side by side, the skewer $b$ is placed between the points thereof, the binding-cord $c$ is passed through the hole $e$ in or near the outer end of the skewer, then after the wrapper $d$ is wound a few turns around the points of the scythes and skewer, the ends of the cord are brought over the wrapper onto the blades, and the winding of the wrapper is continued over the cords $c$, blades $a$, and skewer $b$ until the whole length of the scythe-blade is completely wrapped secure for market. Thus greater security is produced against breakage and damage in transportation.

I believe I have thus shown the nature, construction, and advantage of this invention, so as to enable others skilled in the art to make and use the same therefrom.

What I claim, therefore, and desire to secure by Letters Patent, is—

The skewer $b$, in combination with the cord $c$, and wrapper $d$, substantially as and for the purpose set forth.

LOVITT STIMSON. [L. S.]

Witnesses:
R. R. SMITH,
E. R. CARTER.